United States Patent [19]

Petropoulos et al.

[11] Patent Number: 5,021,109

[45] Date of Patent: Jun. 4, 1991

[54] METHOD OF PREPARING A MULTILAYERED BELT

[75] Inventors: Mark Petropoulos; John M. Hammond, both of Ontario, N.Y.

[73] Assignee: Xerox Corporation, Stamford, Conn.

[21] Appl. No.: 459,130

[22] Filed: Dec. 29, 1989

[51] Int. Cl.$^5$ .............................................. G03G 5/00
[52] U.S. Cl. ................................... 156/137; 430/127; 430/132; 156/83
[58] Field of Search ............... 355/212, 213; 430/131, 430/132, 127; 156/83, 137; 264/343

[56] References Cited

U.S. PATENT DOCUMENTS

| | | | |
|---|---|---|---|
| 2,565,316 | 8/1946 | Lucas et al. | 156/83 |
| 3,819,370 | 6/1974 | Komiya et al. | 430/132 |
| 3,928,036 | 12/1975 | Jones | 430/69 |
| 3,994,726 | 11/1976 | Wales | 156/160 |
| 4,006,019 | 2/1977 | Karam | 156/246 |
| 4,033,768 | 7/1977 | Wieloch | 156/137 |
| 4,127,632 | 11/1978 | Anger . | |
| 4,311,654 | 1/1982 | Blandin . | |
| 4,332,751 | 6/1982 | Brassell et al. . | |
| 4,386,629 | 6/1983 | Cook et al. | 156/83 |
| 4,439,258 | 3/1984 | Toma et al. | 430/132 |
| 4,481,234 | 11/1984 | Kolpe et al. | 430/132 |
| 4,675,061 | 6/1987 | Mead . | |
| 4,711,833 | 12/1987 | McAneney et al. . | |
| 4,747,992 | 5/1988 | Sypula et al. . | |
| 4,772,253 | 9/1988 | Koizumi et al. | 355/212 |
| 4,921,773 | 5/1990 | Melnyk et al. | 430/132 |

Primary Examiner—Caleb Weston
Assistant Examiner—Daniel J. Stemmer
Attorney, Agent, or Firm—Oliff & Berridge

[57] ABSTRACT

A process for preparing a multilayered belt comprises heating a substrate formed of a polymeric material, the substrate having a predetermined inner circumference, to at least about the glass transition temperature of the polymeric material and then placing the sleeve on a cylindrical mandrel. The mandrel has an outer circumference slightly greater than the predetermined inner circumference of the seamless tube. The substrate on the mandrel is subsequently coated to form a multilayered composite belt. The composite belt is then heated to a temperature of at least about the glass transition temperature of the substrate and the composite structure is removed from one end of the mandrel. Removal of the composite belt from the mandrel may be facilitated by any suitable means such as small driven elastomeric rollers, vacuum cups, gravity with vacuum assist and the like. Upon cooling, the composite structure has the predetermined inner circumference.

33 Claims, No Drawings

METHOD OF PREPARING A MULTILAYERED BELT

BACKGROUND OF THE INVENTION

This invention relates to a method for preparing a multilayered belt, more particularly, to a method of preparing a photoreceptor belt using a rotatable mandrel.

Generally, photoreceptor belt fabrication systems require considerable space for equipment and processing. For coated belts, elaborate handling procedures and machinery are needed to manipulate the belts between stations where successive coatings are applied to the substrate belt. Such handling between coatings increases the likelihood of damage due to scratches, creases, folds, fingerprints, dust contamination and the like which reduce overall yield and increase cost.

Photoreceptor belts typically have thicknesses greater than about 10 mils and are usually formed by molding or lamination. Molding is carried out in molds, which often results in flashings which must be removed to achieve smooth outer surfaces. Lamination may alternatively be employed to form photoreceptor belts. Lamination may be accomplished by applying alternate layers of thermoplastic sheets and reinforcing fabrics. Other types of belts have been prepared by welding opposite ends of sheets together to form belts having seams.

In the past, photoreceptors for electrophotographic imaging systems have employed selenium alloys vacuum deposited on rigid aluminum substrates. These photoreceptors require elaborate, highly sophisticated, and expensive equipment for fabrication. Photoreceptors have also been prepared by coating rigid substrates with photoconductive particles dispersed in organic film-forming binders. Coating of rigid drum substrates has been effected by various techniques such as spraying, dip coating, vacuum evaporation, and the like. Rigid drum photoreceptors limit apparatus design flexibility and flash exposure and are expensive.

Flexible organic photoreceptors in the form of belts have recently become commonplace. Flexible photoreceptors have been manufactured by coating a web and thereafter shearing the web into segments which are formed into belts by welding opposite ends of the sheared web. The resulting welded seam on the photoreceptor disrupts the continuity of the outer surface of the photoreceptor and must be indexed so that it does not print out during an imaging cycle. Efficient stream feeding of paper and throughput are adversely affected in such systems because of the necessity to detect a seam within the length of each sheet of paper. The mechanical and optical devices required for indexing add to the complexity and the cost of copiers and printers, and reduce the flexibility of design. Welded belts are also less desirable for electrophotographic imaging systems because the seam forms a weak point in the belt and tends to collect toner debris during cleaning, particularly with wiper blade cleaning devices.

U.S. Pat. No. 4,747,992 (incorporated herein by reference) is directed to a process for fabricating a seamless belt in which a substrate layer is formed on a mandrel by coating a polymeric film-forming material, which is then solidified. Additional layers may be applied to the substrate to provide layers needed for photoreceptors.

Important considerations in manufacturing photoreceptors by applying layers onto a substrate on a mandrel include providing precise dimensions, particularly the interior circumference of the substrate, ensuring that the substrate is tightly held on the mandrel while applying the layers ease of removal of the multilayered product from the mandrel and commercial production considerations, such as simplification of the process and increased speed of production.

In the method according to U.S. Pat. No. 4,747,992, after solidifying the polymeric coating on the mandrel, both the solid coating and the mandrel are heated to a temperature at least above the apparent glass transition temperature ($T_g$) to expand the coating and the mandrel while maintaining contact between the coating and the mandrel. The solid coating is then cooled to below the apparent $T_g$, after which the mandrel is cooled, such that the mandrel contracts at a greater rate than the polymeric coating, until separation occurs between the mandrel and the coating. The coating is then removed from the mandrel.

SUMMARY OF THE INVENTION

It is a feature of the present invention to provide a process for fabricating an improved thin, flexible seamless belt which is superior to previous processes.

In accordance with the present invention, a seamless substrate in the form of a tubular sleeve of a predetermined inner circumference and formed of polymeric material, is heated to at least about the apparent glass transition temperature of the polymeric material, so that the tubular sleeve is expanded. While the tubular sleeve is thus expanded, it is placed on a mandrel having an outer diameter which is greater than the predetermined inner circumference of the tubular sleeve. The tubular sleeve, upon cooling, therefore tightly fits on the mandrel. The tubular sleeve is then treated, preferably by applying one or more layers on the sleeve to form a multilayered composite belt. The composite belt is then again heated to at least about the apparent glass transition temperature of the polymeric material of the tubular sleeve, so that the tubular sleeve is again expanded, and the composite belt is removed from the mandrel. Upon cooling, the composite belt preferably has the predetermined inner circumference.

The present invention provides a simple and inexpensive process by which a flexible seamless belt can be produced having precise dimensions. The process according to the present invention enables layers to be applied to a substrate which is easily placed on and removed from a mandrel, and which is tightly held on the mandrel to enable one or more layer to be accurately applied. The process according to the present invention moreover provides the above advantages while enabling the use of a simple cylindrical mandrel, if desired. Furthermore, the process according to the present invention is simple and can achieve reductions in the size of necessary equipment, as well as increases in rates of production.

The invention may be more fully understood with reference to the description which follows. The invention should be recognized as contemplating all modifications within the skill of an ordinary artisan.

DETAILED DESCRIPTION OF THE PREFERRED EMBODIMENTS

In accordance with the present invention, as mentioned above, a substrate in the form of a tubular sleeve formed of a polymeric material and having a predetermined inner circumference is heated to at least about the apparent glass transition temperature of the polymeric material. As a result, the substrate expands to have an inner circumference which is larger than the predetermined inner circumference.

The glass transition temperature ($T_g$), of a polymer is defined as the temperature range in which a noncrystalline polymer changes from a glassy solid to a rubbery liquid. Since the composite product generally comprises a mixture of film-forming polymer (a major component), residual solvent and, in some instances, additives, the $T_g$ of the solidified coating is usually less than the value of the $T_g$ of the polymer itself and is therefore defined herein as the apparent $T_g$. The $T_g$ values of polymers are well known and readily available in the technical literature. Apparent $T_g$ values may be determined by various well known techniques such as by differential scanning calorimetry (DSC).

The substrate may be formed of any suitable polymer, which polymers include polycarbonates (e.g. Makrolon 5705, available from Bayer Chemical Co., Merlon M39, available from Mobay Chemical Co., Lexan 145, available from General Electric Co.), polysulfones (e.g. P-3500, available from Union Carbide Corp.), polyesters (e.g. PE-100 and PE-200, available from Goodyear Tire and Rubber Co.), cellulosic resins, polyarylates, alkyds, acrylics, styrene-butadiene copolymers, polyarylsulfones, polybutylenes, polyether sulfones, polyphenylenesulfides, polyurethanes, polyimides, epoxies, poly(amide-imide) (e.g. A1830, available from AMOCO Chemical Corp.), copolyesters (Kodar Copolyester PETG 6763 available from Eastman Kodak Co.) polyethersulfones, polyetherimide (e.g. available from General Electric Co.), polyether sulfone, polyvinylidine fluoride (e.g. available from Pennwalt Corp.), polyvinyl fluoride (e.g. available from E. I. du Pont de Nemours & Co.), polyarylethers, and the like, and mixtures thereof. Polycarbonate polymers may be made, for example, from 2,2-bis(4-hydroxyphenol)propane, 4,4''-dihydroxy-diphenyl-1,1-ethane, 4,4'-dihydroxy-diphenyl-1,1-isobutane, 4,4'-dihydroxy-diphenyl-4,4-heptane, 4,4'-dihydroxy-diphenyl-2,2-hexane, 4,4'-dihydroxy-triphenyl-2,2,2-ethane, 4,4'-dihydroxy-diphenyl-1,1-cyclohexane, 4,4'-dihydroxy-diphenyl-$\beta$-$\beta$-decahydronaphthalene, cyclopentane derivatives of 4,4'-dihydroxy-diphenyl-$\beta$-$\beta$-decahydronaphthalene, 4,4'-dihydroxy-diphenylsulphone, and the like.

Any suitable additive may be added to the composition out of which the tubular sleeve is formed. For example, the additive may be added to facilitate substrate removal. Typical release materials include, for example, mold release agents such as silicones, fluoropolymers including fluorocarbons, hydrocarbons, soaps, detergents, surfactants (e.g. Silwet L-7500, Silwet L-7602, GAFAC RA600), and the like. Generally, the amount of release material added is less than about 10 percent based on the total weight of the composition.

The substrate may be opaque or substantially transparent and may comprise any other suitable components in addition to the polymeric material. Thus, for example, the tube or substrate layer may be formed of an electrically nonconductive or conductive material. If the conductive substrate contains a nonconductive component it also contains sufficient conductive material to render the layer conductive. Any suitable conductive material may be used. For example, the conductive material may include metal flakes, powders or fibers in a binder resin including metal oxides, sulfides, silicides, quaternary ammonium salt compositions, conductive polymers such as polyacetylene or their pyrolysis and molecular doped products, charge transfer complexes, polyphenylsilane and molecular doped products from polyphenylsilane. Typical insulating non-conducting materials include film-forming polymers such as polyesters, polycarbonates, polyamides, polyurethanes, and the like. The insulating or conductive substrate should be thin and flexible An insulating substrate comprising amorphous polymers such as polycarbonate polymers from diphenyl-1,1-cyclohexane and phosgene having a molecular weight of from about 25,000 to about 60,000 is particularly preferred in some applications because such a substrate is mechanically strong and resists crazing and cracking when exposed to solvents employed in subsequently applied coatings during the production of electrostatographic imaging members.

The desired thickness of the flexible substrate layer depends on a number of factors, including economic considerations The substrate typically is of a thickness between about 500 micrometers and about 15 micrometers. When the belt is used in an electrostatographic imaging member, the thickness of the substrate layer should be selected to avoid any adverse affects on the final device. Substrates should not be so thin that they split and/or exhibit poor durability characteristics The substrate should likewise not be excessively thick, which may give rise to early failure during cycling and higher cost for unnecessary material. Also, substrates that are too thick have lower flexibility as opposed to thinner substrates. If the substrate layer is formed of an insulating material and is intended to be employed in an electrostatographic imaging member, it is normally coated with one or more additional layers such as a conductive layer.

Conductive layers are particularly desirable for the ground plane of electrostatographic imaging members. As indicated herein, electrically conductive material may be incorporated into the tubular sleeve or may be applied as a coating layer. More specifically, the conductive layer may comprise a film forming binder containing dispersed conductive particles. Thus, if desired, the seamless tubular sleeve itself may be rendered electrically conductive by the incorporation of conductive particles in a binder material at a sufficient loading to provide the electrical conductivity desired. A typical conductive particle loading is from 10 percent to about 35 percent by weight based on the total weight of the layer. Typical conductive particles include carbon black, metal powders ionic organic conductive particles, conductive inorganic particles, $SnO_2$ doped with antimony or indium, conductive zinc oxide, and the like. The conductive layer composition is preferably a sprayable composition including, for example, finely divided aluminum, titanium, nickel, chromium, brass, gold, stainless steel, carbon black, graphite and the like dispersed in a film-forming polymer binder such as the polymers employed in the nonconductive layer described hereinabove and hereinbelow.

The conductive layer may be of a thickness within a substantially wide range, depending on the desired use of the final belt. Satisfactory thicknesses for the conductive layer generally range from about 1 micrometer to about 20 micrometers when the conductive layer is applied to a supporting substrate. When a flexible electrostatographic imaging device is desired, the thickness of the conductive layer may range from about 0.1 micrometer to about 5 micrometers. A conductive layer that is too thick may adversely affect belt flexibility and a conductive layer that is unduly thin may not be uniformly conductive.

The substrate, heated to at least about the apparent glass transition temperature of the polymeric material out of which the substrate is formed so as to cause the substrate to expand, is then positioned on a mandrel.

The mandrel is generally cylindrical and may be hollow or solid. The outer diameter of the mandrel is greater than the predetermined inner diameter of the substrate (i.e., prior to heating the substrate). The outer diameter of the mandrel is preferably about 0.2% to about 1.0% larger than the predetermined inner circumference of the substrate. The outer diameter of the mandrel is preferably smaller than the inner circumference of the substrate when the substrate is heated to at least the apparent glass transition temperature of the polymeric material out of which the substrate is formed. The mandrel surface functions as a holding surface for the substrate. The mandrel preferably has a tapered end to facilitate applying and removing the substrate.

The mandrel may comprise any suitable material. The mandrel should be dimensionally and thermally stable at the processing temperatures utilized. It also should be insoluble in any liquid carrier employed in the coating materials and should not react chemically with the coating material or other components thereof. The mandrel may be uncoated or, if desired, be coated with a suitable release coating prior to applying the substrate and subsequent coatings that are used to form the ultimate seamless belt. Typical mandrel materials include metals such as aluminum, stainless steel, nickel, chromium, copper, brass, and the like. Typical polymeric mandrel materials include polyethylene, polypropylene, polymethylpentene copolymers thereof, and the like. Typical ceramic mandrel materials include ceramic, glass, clay and the like. The mandrel may be formed by extrusion, molding, injection molding, casting and the like to achieve the desired shape. For best release, the mandrel surface preferably has a low critical surface tension. The outer surface of the mandrel may be coated with a release coating, preferably a fluoropolymer, polished or treated in any other suitable manner to reduce sliding friction between the mandrel surface and the substrate. Mandrels having an outer surface of polyethylene, polypropylene, polymethylpentene or copolymers thereof are particularly preferred because they facilitate uniform leveling of the coating and contribute to release of the completed composite structure after the structure is heated. A mandrel entirely composed of polyethylene is an example of a reusable polymeric release material which can be employed as a self supporting mandrel.

Release agents may be employed to facilitate removal of a composite structure from the mandrel and positioning of the substrate on the mandrel. Generally, the release material may be selected from one of three specific types. These three types are reusable polymeric materials, either self-supporting or coated on a suitable substrate; a liquid or dispersion which is applied as a coating to a supporting substrate; and a liquid or powder that may be added to the tube or substrate to promote release. Typical release materials include fluorocarbon polymers such as polyvinylidene fluoride (e.g. Kynar 7201, Kynar 301F, Kynar 202 and Kynar 301F, available from Pennwalt Co.), polytetrafluoroethylene (e.g. Teflon, available from E. I. du Pont de Nemours & Co.), filled polytetrafluoroethylene (e.g. Teflon S, available from E. I. du Pont de Nemours & Co.), polyethylene, polypropylene, phenolic resins, polyphenylene sulfide resins silicones (e.g. Dow Corning 20, available from Dow Corning Corp.), hydrocarbons (e.g. Frekote 44, available from Kreekote Corp.), soaps, detergents, and the like and mixtures thereof. When release coatings are employed, the release coatings are preferably applied to a clean mandrel surface. Conventional industrial procedures such as chemical washing, solvent cleaning and degreasing of the mandrel prior to application of the release coating may be utilized. Depending upon the initial condition of the mandrel surface, it may be desirable to remove dirt, rust, mill scale, paint, oil and the like. Adhesion of the release coating to the mandrel surface may be improved by grit blasting or by conversion of coatings typically employed on metal substrates such as zinc manganese, ion phosphates, chromates, and the like. Soft metal mandrel surfaces may be hardened to improve wear by employing conventional face hardening techniques such as by applying a glass, ceramic frit, flame sprayed stainless steel, and the like coating.

In accordance with the present invention, layers are then coated onto the substrate tightly held on the mandrel. In the production of an electrostatographic imaging member in accordance with the present invention, the layers applied to the substrate may comprise, for example, a blocking layer an adhesive layer, a photoconductive layer, a transport layer or a combination of these layers with or without additional layers.

Such coating materials (discussed in detail hereinafter) may be deposited on the substrate from solutions, dispersions, emulsions or powders by any suitable technique. The deposited coating or coatings should form a thin substantially uniform coating on the tube or substrate. Typical techniques for depositing coatings include spray coating, dip coating, wire wound rod coating, powder coating, electrostatic spraying, sonic spraying, blade coating, and the like. If the coating is applied by spraying, spraying may be effected with or without the aid of a gas. Spraying may be assisted by mechanical and/or electrical aids such as in electrostatic spraying.

A typical spray gun that may be employed in the process of this invention comprises a central fluid nozzle surrounded closely by an annular concentric air nozzle. The fluid is forced out through the fluid nozzle either by the vacuum created by gas flow through the annular concentric nozzle or by pressurizing the fluid container. Primary atomization (dispersion of fluid droplets) takes place at the exit from the fluid nozzle. Secondary atomization (finer dispersion) occurs at the impingement of the annular gas stream with fluid droplet dispersion. Further atomization and shaping of the spray pattern is produced by gas jets at greater distances from the fluid nozzle. The shape of the spray pattern can be varied from circular to elliptical by gas pressure applied through apertures and impinging at an angle to the main droplet stream. A typical spray gun having these features is a Model 21 spray gun available from Binks Company Franklin Park, Ill.

It is preferred for optimum uniform coating of the tube or substrate, that the mandrel is normally rotated about its axis and the spray gun is traversed in a direction parallel to the mandrel axis. Materials and process parameters are interdependent in a spray coating operation. Some of the process parameters include propellant gas pressure, solution flow rate secondary gas nozzle pressure, gun to substrate distance, gun traversal speed and mandrel rotation rate. Materials parameters include, for example, solvent mixtures which affect drying characteristics, the concentration of dissolved solids, the composition of the dissolved solids (e.g. monomer, polymer), and the concentration of dispersed solids when dispersions or solutions are utilized. The deposited coating should be uniform, smooth, and free from blemishes such as entrained gas bubbles and the like.

The coating solutions that are applied by spraying are normally prepared by dissolving polymer in a solvent or blend of solvents.

Generally, when liquid carriers are utilized in the coating layers, drying of each of the underlying layers is desirable prior to application of a subsequent layer. It is preferred that drying of each of the underlying layers be effected at a temperature less than the apparent $T_g$ of any of the solid coatings in any of the underlying layers because drying above the apparent $T_g$ would perhaps lead to premature release of the structure from the mandrel. This could result in non-uniform poor quality belts. Generally, the apparent $T_g$ of the substrate is not exceeded when the coatings are applied to the substrate at a temperature well below 130° C. and, more preferably, from about room temperature to about 60° C. Some reasons for drying each coating at relatively low temperatures prior to the application of a subsequent coating are to more rapidly remove the liquid carrier to avoid the formation of blisters. Economy is another reason for drying the underlying coatings at a temperature of from about room temperature up to about 60° C. immediately after each deposited layer.

The coatings subsequently applied to the tube or substrate may be polymerized in situ after deposition by suitable techniques such as thermal curing to form the final solid film layer.

Any suitable blocking layer or layers may be applied as one of the belt coatings. Typical blocking layers include gelatin (e.g. Gelatin 225, available from Knox Gelatine Inc.), and Carboset 515 (B. F. Goodrich Chemical Co.,) dissolved in water and methanol, polyvinyl alcohol, polyamides, gamma-aminopropyl triethoxysilane, and the like. Blocking layers may generally range in thickness from about 0.01 micrometer to about 2 micrometers, and preferably are of thicknesses of from about 0.1 micrometer to about 1 micrometer. Thicknesses outside these ranges may be selected. The blocking layer may be applied with any suitable liquid carrier. Typical liquid carriers include water, methanol, isopropyl alcohol, ketones, esters, hydrocarbons, and the like.

Any suitable adhesive layer may be applied as one of the belt coatings of this invention. Typical adhesive layers include polyesters (e.g. du Pont 49,000, available from E. I. du Pont de Nemours & Co.), 2-vinylpyridene, 4-vinylpyridine and the like. Adhesive layers may generally range in thickness from about 0.05 micrometer to about 2 micrometers, and preferably are of thicknesses of from about 0.2 micrometer to about 1 micrometer. Thicknesses outside these ranges may also be selected. The adhesive layer may be applied with a suitable liquid carrier. Typical liquid carriers include methylene chloride ethanol, isopropyl alcohol, ketones, esters, hydrocarbons and the like.

Any suitable photoconductive layer or layers may be applied as one of the belt coatings. The photoconductive layer or layers may contain inorganic or organic photoconductive materials. Typical inorganic photoconductive materials include well known materials such as amorphous selenium, selenium alloys, halogen-doped selenium alloys such as selenium-tellurium, selenium-tellurium-arsenic, selenium-arsenic, cadmium sulfide, zinc oxide, titanium dioxide and the like. Inorganic photoconductive materials are normally dispersed in a film-forming polymer binder. Typical organic photoconductors include phthalocyanines, quinacridones, pyrazolones, polyvinylcarbazole-2,4,7-trinitrofluorenone, anthracene and the like. Many organic photoconductor materials may also be used as particles dispersed in a resin binder.

Any suitable multilayer photoconductors may also be employed. The multilayer photoconductors comprise at least two electrically operative layers, a photogenerating or charge generating layer and a charge transport layer. The charge generating layer and charge transport layer as well as the other layers may be applied in any suitable order to produce either positive or negative charging photoreceptors. For example, the charge generating layer may be applied prior to the charge transport layer as in U.S. Pat. No. 4,265,990 or the charge transport layer may be applied prior to the charge generating layer as in U.S. Pat. No. 4,346,158 the entire disclosures of these patents being incorporated herein by reference.

The photogenerating layer may comprise a single layer or multiple layers comprising inorganic or organic compositions and the like. One example of a generator layer is described in U.S. Pat. No. 3,121,006 (incorporated herein by reference) wherein finely divided particles of a photoconductive inorganic compound are dispersed in an electrically insulating organic resin binder. Useful binder materials disclosed therein include those which are incapable of transporting for any significant distance injected charge carriers generated by the photoconductive particles. Thus, the photoconductive particles must be in substantially contiguous particle-to-particle contact throughout the layer for the purpose of permitting charge dissipation required for cyclic operation. Thus, about 50 percent by volume of photoconductive particles is usually necessary in order to obtain sufficient photoconductive particle-to-particle contact for rapid discharge.

Examples of photogenerating layers include trigonal selenium, various phthalocyanine pigments such as the X-form of metal free phthalocyanine described in U.S. Pat. No. 3,357,989 (incorporated herein by reference), metal phthalocyanines such as copper phthalocyanine, quinacridones available from Du Pont under the tradename Monastral Red, Monastral violet and Monastral Red Y, substituted 2,4-diaminotriazines disclosed in U.S. Pat. No. 3,442,781 (incorporated herein by reference), polynuclear aromatic quinones available from Allied Chemical Corporation under the tradename Indofast Double Scarlet, Indofast Violet Lake B, Indofast Brilliant Scarlet Indofast Orange. Examples of photosensitive members having at least two electrically operative layers include the charge generator layer and diamine containing transport layer members disclosed in U.S. Pat. Nos. 4,265,990, 4,233,384, 4,306,008, and 4,299,897 (each incorporated herein by reference); dyestuff generator layer and oxadiazole, pyrazolone, imidazole, bromopyrene, nitrofluorene and nitronaphthalimide derivative-containing charge transport layer members disclosed in U.S. Pat. No. 3,895,944 (incorporated herein by reference); generator layer and hydrazone-containing charge transport layers members disclosed in U.S. Pat. No. 4,150,987 (incorporated herein by reference); generator layer and tri-aryl pyrazoline compound-containing charge transport layer members disclosed in U.S. Pat. No. 3,837,851 (incorporated herein by reference); and the like.

Photogenerating layers containing photoconductive compositions and/or pigments and the resinous binder material generally range in thickness from about 0.1 micrometer to about 5.0 micrometers, and preferably have a thickness of from about 0.3 micrometer to about 1 micrometer. Thicknesses outside these ranges may also be selected. The photogenerating composition or pigment may be present in the film-forming polymer binder compositions in various amounts. For example, from about 10 percent by volume to about 60 percent by volume of the photogenerating pigment may be dispersed in about 40 percent by volume to about 90 percent by volume of the film-forming polymer binder composition, and preferably from about 20 percent by volume to about 30 percent by volume of the photogenerating pigment may be dispersed in about 70 percent by volume to about percent by volume of the film-forming polymer binder composition. The particle size of the photoconductive compositions and/or pigments is preferably between about 0.01 micrometer and about 0.5 micrometer to facilitate better coating uniformity.

Any suitable transport layer may be applied as one of the belt coatings of this invention to form a multilayered photoconductor. The transport layer may contain a film-forming polymer binder and a charge transport material. A preferred multilayered photoconductor comprises a charge generation layer comprising a layer of photoconductive material and a contiguous charge transport layer of a polycarbonate resin material having a molecular weight of from about 20,000 to about 120,000 having dispersed therein from about 25 to about 75 percent by weight of one or more compounds having the general formula:

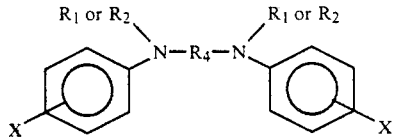

wherein $R_1$ and $R_2$ are the same or different and represent aromatic groups selected from the group consisting of a substituted or unsubstituted phenyl group, naphthyl group, and polyphenyl group, $R_4$ is selected from the group consisting of a substituted or unsubstituted biphenyl group, diphenyl ether group, alkyl group having from 1 to 18 carbon atoms, and cycloaliphatic group having from 3 to 12 carbon atoms and X is selected from the group consisting of an alkyl group having from 1 to about 4 carbon atoms and chlorine, the photoconductive layer exhibiting the capability of photogeneration of holes and injection of the holes and the charge transport layer being substantially non-absorbing in the spectral region at which the photoconductive layer generates and injects photogenerated holes but being capable of supporting the injection of photogenerated holes from the photoconductive layer and transporting the holes through the charge transport layer. Examples of charge transporting aromatic amines include those represented by the structural formula above and others for charge transport layers capable of supporting the injection of photogenerated holes of a charge generating layer and transporting the holes through the charge transport layer include N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N,-diphenyl-N,N,-bis(3"-methylphenyl)-(1,1'-biphenyl)-4,4'-diamine, and the like dispersed in an inactive resin binder. Examples of some of these transport materials are described, for example in U.S. Pat. No. 4,265,990 to Stolka et al, the entire disclosure thereof being incorporated herein by reference. Other examples of charge transport layers capable of supporting the injection of photogenerated holes of a charge generating layer and transporting the holes through the charge transport layer include triphenylmethane, bis(4-diethylamine-2-methylphenyl)-phenylmethane; 4'-4"-bis(diethylamino)-2',2"-dimethyltriphenyl methane and the like dispersed in an inactive resin binder. Numerous inactive resin materials may be employed in the charge transport layer including those described, for example, in U.S. Pat. No. 3,121,006, the entire disclosure of which is incorporated herein by reference. The resinous binder for the charge transport layer may be identical to the resinous binder material employed in the charge generating layer. Typical organic resinous binders include thermoplastic and thermosetting resins such as polycarbonates, polyesters, polyamides, polyurethanes, polystyrenes, polyarylethers polyarylsulfones, polybutadienes, polysulfones, polyethersulfones, polyethylenes, polypropylenes, polyimides, polymethylpentenes, polyphenylene sulfides, polyvinyl acetate, polysiloxanes polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), sytyrenebutadiene copolymer, vinylacetate-vinylidenechloride copolymers, styrene-alkyd resins, and the like. These polymers may be block, random or alternating copolymers.

Generally, the thickness of the solidified transport layer may be between about 5 and 100 microns, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the solidified charge transport layer to the charge generator layer is preferably maintained from about 2:1 to 200:1 and in some instances as great as 400:1.

If desired, the photoreceptor may also include an overcoating. Any suitable overcoating may be utilized in the fabrication of the photoreceptor of this invention. Typical overcoatings include silicone overcoatings described, for example, in U.S. Pat. No. 4,565,760, polyamide overcoatings (e.g. Elvamide, available from E. I. du Pont de Nemours & Co.), tin oxide particles dispersed in a binder described, for example, in U.S. Pat. No. 4,426,435, metallocene compounds in a binder described, for example, in U.S. Pat. No. 4,315,980, antimony-tin particles in a binder, charge transport molecules in a continuous binder phase with charge injection particles, described in U.S. Pat. No. 4,515,882, polyurethane overcoatings, and the like, the disclosures of U.S.

Pat. Nos. 4,565,760, 4,426,435, 4,315,980, and 4,515,882 being incorporated herein by reference in their entirety. The choice of overcoating materials would depend upon the specific photoreceptor prepared and the protective quality and electrical performance desired. Generally, any overcoatings applied have thicknesses between about 0.5 micrometer and about 10 micrometers.

In a preferred embodiment of the present invention, the substrate and the coated layers are cut to desired size while positioned on the mandrel. To facilitate this cutting, the mandrel preferably has a groove formed therein, preferably a generally circumferential groove.

Release of the composite structure from the mandrel is accomplished by heating the composite structure to the apparent glass transition temperature of the polymer out of which the substrate is formed. When heated accordingly, the substrate and any layer(s) coated thereon expand, and the composite structure is removed from the mandrel. It is preferred that the apparent glass transition temperature of the substrate not differ greatly from that of any layer applied to the substrate, and that the temperature to which the composite is heated exceed, but not greatly exceed, the apparent glass transition temperatures of any applied layer and of the substrate.

Removal of the composite structure may be facilitated by any suitable means such as small driven elastomeric rollers in contact with the mandrel surface, vacuum cups or other vacuum means to grip the composite, gravity with vacuum assist and the like.

A fluid may be introduced between the substrate and mandrel prior to removing the composite structure from the mandrel to further reduce adhesion between the mandrel and the substrate. The fluid may comprise one or more jets of air or a liquid introduced at one or both ends of the mandrel between the mandrel surface and the substrate. The jets of fluid may be heated or at room temperature. Ionized air or moisturized air may also be utilized to promote removal of the belt from the mandrel by neutralizing static charges on the belt. Additionally or alternatively, ultrasonic energy may be applied to the mandrel and/or composite structure to facilitate removal of the structure Upon cooling the composite structure, the inner circumference of the substrate preferably contracts to the predetermined inner circumference. Any extent to which the above-described treatments result in the inner circumference of the final product differing from the inner circumference of the substrate prior to treatment can be compensated for by appropriate selection of starting inner circumference.

The process of this invention is suitable for preparing seamless organic photoreceptors comprising a seamless substrate, conductive ground plane and one or more photoconductive layers. The process of this invention may be used to prepare a seamless organic photoreceptor at a single station, thereby reducing or eliminating handling and cleaning between deposition of various layers, as well as enabling significant reduction of the size occupied by necessary equipment.

The process of this invention may also be suitable for preparing any other multilayered composite belt.

EXAMPLE

In a representative test, a nylon 12 substrate having an inner circumference of 842.6 mm was heated to about 50° C. and was mounted on an aluminum mandrel having an outer diameter of 844.6 mm. The substrate was easily mounted on the mandrel and, upon cooling, was securely held on the mandrel. The substrate was again heated to about 50° C. and was easily removed from the mandrel.

Although the method in accordance with the present invention has been described in connection with preferred embodiments, it will be appreciated by those skilled in the art that additions, modifications, substitutions and deletions not specifically described may be made without departing from the spirit and the scope of the invention defined in the appended claims.

What is claimed is:

1. A method for fabricating a seamless belt, comprising the steps of:
   heating a substrate formed of a polymeric material in the shape of an endless belt to at least about the apparent glass transition temperature of said polymeric material to expand said substrate;
   mounting said heated substrate on a mandrel;
   applying at least one layer to said mounted substrate to form a composite belt;
   heating said composite belt to at least about said apparent glass transition temperature to expand said composite belt; and
   removing said composite belt from said mandrel.

2. The method recited in claim 1, wherein said polymeric material is selected from the group consisting of polycarbonates, polysulfones, polyesters, cellulosic resins, polyarylates, alkyds, acrylics, styrene-butadiene copolymers, polyarylsulfones, polybutylenes, polyether sulfones, polyphenylenesulfides, polyurethanes, polyimides, epoxies poly(amideimide), copolyesters, polyethersulfones, polyetherimide, polyether sulfone, polyvinylidine fluoride, polyvinyl fluoride, polyarylethers and polyamides.

3. The method recited in claim 1, wherein a plurality of layers are applied to said mounted substrate.

4. The method recited in claim 3, wherein said composite belt is heated to at least about an apparent glass transition temperature of each of said plurality of layers.

5. The method recited in claim 1, wherein said at least one layer is selected from the group of layers consisting of electrically conductive layers, blocking layers, adhesive layers, photoconductive layers, photogenerating layers, transport layers and overcoating layers.

6. The method recited in claim 1, wherein said at least one layer is applied by rotating said mandrel about an axis thereof and spraying a layer-forming material toward said substrate.

7. A method for fabricating a seamless belt, comprising the steps of:
   heating a substrate formed of a polymeric material in the shape of an endless belt having a predetermined inner circumference to at least about the apparent glass transition temperature of said polymeric material to expand said substrate;
   mounting said heated substrate on a mandrel having an outside diameter larger than said predetermined inner circumference;
   applying at least one layer to said mounted substrate to form a composite belt;
   heating said composite belt to at least about said apparent glass transition temperature to expand said composite belt; and
   removing said composite belt from said mandrel, such that, upon cooling, said composite belt has an inner circumference approximately equal to said predetermined inner circumference.

8. The method recited in claim 7, wherein said polymeric material is selected from the group consisting of polycarbonates, polysulfones, polyesters, cellulosic resins polyarylates, alkyds, acrylics, styrene-butadiene copolymers, polyarylsulfones, polybutylenes, polyether sulfones, polyphenylenesulfides, polyurethanes, polyimides, epoxies, poly(amideimide), copolyesters, polyethersulfones, polyetherimide, polyether sulfone, polyvinylidine fluoride, polyvinyl fluoride, polyarylethers and polyamides.

9. The method recited in claim 8, wherein said polymeric material further comprises a release material.

10. The method recited in claim 7, wherein said substrate is of a thickness of from about 15 to about 500 micrometers.

11. The method recited in claim 7, wherein said mandrel is cylindrical.

12. The method recited in claim 11, wherein said mandrel has a tapered end at which said mounting and said removing are conducted.

13. The method recited in claim 7, wherein a release coating is applied to an outer surface of said mandrel.

14. The method recited in claim 13, wherein said release coating comprises a fluoropolymer.

15. The method recited in claim 7, wherein said mandrel is formed from a material selected from the group consisting of polyethylene, polypropylene, polymethylpentene, copolymers thereof, aluminum, stainless steel, nickel, chromium, copper, brass, ceramic, glass and clay.

16. The method recited in claim 7, wherein an outer surface of said mandrel is polished.

17. The method recited in claim 7, wherein an outer diameter of said mandrel is from 0.2% to 1.0% larger than said predetermined inner circumference.

18. The method recited in claim 7, wherein a plurality of layers are applied to said mounted substrate.

19. The method recited in claim 18, wherein said composite belt is heated to at least about an apparent glass transition temperature of each of said plurality of layers.

20. The method recited in claim 7, wherein said at least one layer is selected from the group of layers consisting of electrically conductive layers, blocking layers, adhesive layers, photoconductive layers, photogenerating layers, transport layers and overcoating layers.

21. The method recited in claim 7, wherein said at least one layer is applied by rotating said mandrel about an axis thereof and spraying a layer-forming material toward said substrate.

22. The method recited in claim 7, wherein rollers are in contact with a surface of said mandrel.

23. The method recited in claim 7, further comprising applying vacuum means to grip said composite belt during said removing.

24. The method recited in claim 7, further comprising introducing a fluid between said substrate and said mandrel prior to said removing.

25. The method recited in claim 7, further comprising applying ultrasonic energy to said mandrel.

26. The method recited in claim 7, further comprising applying ultrasonic energy to said composite belt.

27. The method recited in claim 7, wherein said substrate is formed of nylon 12 and has a predetermined inner circumference of about 842.6 mm, and said mandrel as an outer diameter of about 844.6 mm.

28. The method recited in claim 7, further comprising cutting said substrate and said at least one layer while on said mandrel.

29. The method recited in claim 28, wherein said mandrel has a groove formed therein to facilitate said cutting.

30. A method for fabricating a seamless photoreceptor belt, comprising the steps of:
heating a substrate formed of a polymeric material in the shape of an endless belt having a predetermined inner circumference to at least about the apparent glass transition temperature of said polymeric material to expand said substrate such that said substrate has an expanded inner circumference;
mounting said heated substrate on a mandrel having an outside diameter larger than said predetermined inner circumference and smaller than said expanded inner circumference;
applying to said mounted substrate a plurality of layers selected from the group of layers consisting of electrically conductive layers, blocking layers, adhesive layers, photoconductive layers, photogenerating layers, transport layers and overcoating layers to form a composite belt;
heating said composite belt to at least about said apparent glass transition temperature to expand said composite belt; and
removing said composite belt from said mandrel, such that, upon cooling, said composite belt has an inner circumference approximately equal to said predetermined inner circumference.

31. The method recited in claim 30, wherein said polymeric material is selected from the group consisting of polycarbonates, polysulfones, polyesters, cellulosic resins, polyarylates, alkyds, acrylics, styrene-butadiene copolymers, polyarylsulfones, polybutylenes, polyether sulfones, polyphenylenesulfides, polyurethanes, polyimides, epoxies, poly(amideimide), copolyesters, polyethersulfones, polyetherimide, polyether sulfone, polyvinylidine fluorite, polyvinyl fluoride, polyarylethers and polyamides.

32. The method recited in claim 30, wherein said composite belt is heated to at least about an apparent glass transition temperature of each of said plurality of layers.

33. The method recited in claim 30, wherein each of said plurality of layers is applied by rotating said mandrel about an axis thereof and spraying a layer-forming material toward said substrate.

* * * * *